Sept. 17, 1968     L. F. BLATT ET AL     3,401,604
DIFFERENTIAL AREA GAS CYLINDER
Original Filed May 28, 1965
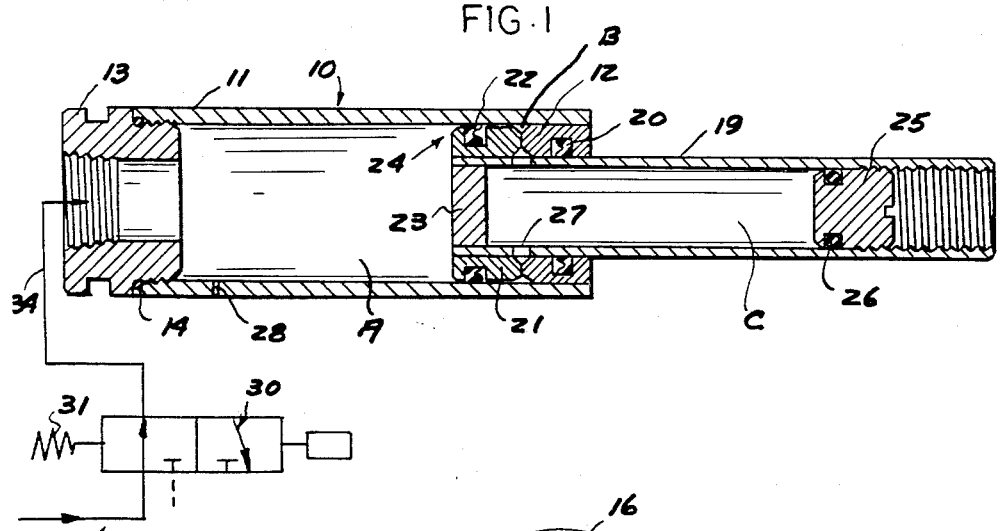
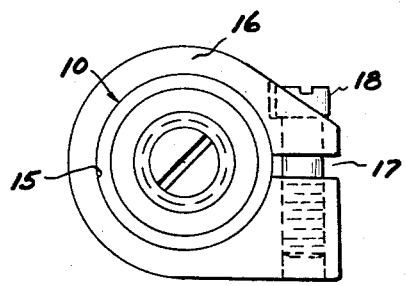
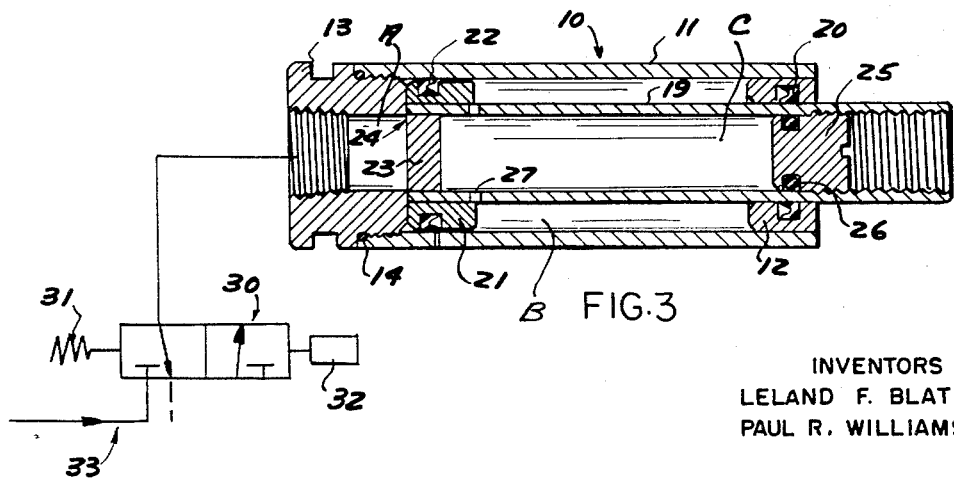
INVENTORS
LELAND F. BLATT
PAUL R. WILLIAMS
BY *Cullen, Sloman & Cantor*
ATTORNEYS United States Patent Office 3,401,604
Patented Sept. 17, 1968

3,401,604
DIFFERENTIAL AREA GAS CYLINDER
Leland F. Blatt and Paul R. Williams, Grosse Pointe Woods, Mich., assignors to Industrial Specialties, Inc., Warren, Mich., a corporation of Michigan
Continuation of application Ser. No. 459,870, May 28, 1965. This application May 17, 1967, Ser. No. 639,246
1 Claim. (Cl. 91—399)

ABSTRACT OF THE DISCLOSURE

The present invention relates to a differential area gas cylinder and more particularly to a cylinder assembly including a piston which is alternately pressurized and depressurized from the blind end thereof for effecting alternate reciprocal movements of the piston rod.

---

This application is a continuation of application Ser. No. 459,870, filed May 28, 1965, which is an improvement over Leland F. Blatt, application Ser. No. 384,854, filed July 24, 1964, now Patent No. 3,232,181, dated Feb. 1, 1966.

It is an object of the present invention to provide a novel differential area gas cylinder adapted for use in conjunction with machine tools and related devices for effecting controlling movements or for actuating a device or for serving as an adjustable stop or the like and wherein the cylinder and piston rod assembly is constructed to provide a series of pressurized control chambers for regulating reciprocal movements of the piston assembly.

It is another object to provide a novel form of differential area gas cylinder by which the blind end only of the cylinder is pressurized for effecting movement in one direction of the piston assembly and upon depressurizing thereof the piston assembly automatically returns to its initial position.

These and other objects will be seen from the following specification and claims in conjunction with the appended drawing in which:

FIG. 1 is a longitudinal section of the present differential area gas cylinder with the piston assembly moved to operative position, and with the controlled source of pressure shown schematically.

FIG. 2 is an end elevational view thereof within a mounting.

FIG. 3 is similar to FIG. 1 with the piston assembly in retracted position.

It will be understood that the above drawing illustrates merely a preferred embodiment of the invention, and that other embodiments are contemplated within the scope of the claims hereafter set forth.

Referring to the drawing, the present differential air gas cylinder, generally indicated at 10, includes a cylinder body 11 having at one end an apertured rod end head 12 and at its other end an apertured blind end head 13 threaded into said body and sealed at 14.

The differential area gas cylinder is adapted for mounting within a suitable support, such as the base of a machine tool, or within a suitable clamping device, such as shown in FIG. 2. Cylinder 10 is nested within bore 15 of clamp 16 whose free end portions as at 17 are adjustably secured together by screw 18.

The present cylinder includes a piston asembly within body 11 including the tubular rod 19, towards one end sealed at 20 within and movably extending through the rod end head 12, and at its other end mounting piston 21. Said piston is sealed at 22 and movable within the body 11. FIGS. 1 and 3. Seal 22 is annular in form, of V shape in cross section, and nested within the peripheral wall of piston 21. The annular tapered free end of seal 22 extends towards the rod end head and under increased pressure will flex inwardly relative to the body wall, providing communication at 24 between chambers A and C.

Thus seal 22 is a valve seal which remains closed normally sealing off chambers A and C. Chamber C is closed at one end by plug 23. Plug 25 is adjustably threaded into the outer end of rod 19 and sealed therein at 26. Thus the volume of chamber C is variable, as desired.

Chamber A is hereafter referred to as a first chamber, and chamber C as a second chamber. A third chamber B is also defined between body 11 and rod 19, and between piston 21 and head 12. Chamber B is gradually reduced in volume as piston 21 is moved to the extended position to FIG. 1, upon pressurizing of first chamber A.

Apertures 27 are formed through the wall of rod 19 to establish communication between chambers B and C. Orifice 28 through body 11 adjacent the blind end head allows gas to escape from area A.

In the illustrative embodiment there is provided a normally open three-way valve 30 schematically shown in FIGS. 1 and 3, which is maintained normally open by coil spring 31 connected to the movable valve spool. The valve is closed by activation of solenoid 32 when it is desired to depressurize chamber A, as in FIG. 3.

The three-way valve is connected to a suitable source of gas under pressure as at 33, which gas may be compressed air for illustration. Conduit 34 interconnects the three-way valve 30 and apertured cylinder head 13. In operation, when pressure is provided to the normally open three-way valve, first chamber A is pressurized. Chamber A progressively includes the adjacent bore of body 11 as piston 21 moves from the position shown in FIG. 3 to its extended position FIG. 1.

Operation

The schematically shown three-way valve 30 biased to normally open position by spring 31, is activated by solenoid 32, FIG. 3, for depressurizing chamber A, and establishing atmospheric communication thereto. Valve 30 could be manually operated, double solenoid operated or pilot operated. Three-way valve 30 supplies line gas pressure through conduit 34 to the single cylinder port or chamber A pressurizing the same.

On initial pressurizing of chamber A, piston 21 moves towards and to the position shown in FIG. 1, with valve 22 sealing off chamber C from chamber A.

At the end of the stroke of piston 21, FIG. 1, continued application of pressure unseats valve seal 22 pressurizing chamber C. Chamber B has been reduced from maximum volume in FIG. 3 to zero volume, FIG. 1. Seal 22 is of a V construction with its annular tapered yieldable flexible portion extending toward the blind end of the cylinder. Seal 22 is designed to allow gas to flow from area A past the seal after piston 21 has stopped against blind head 12. The gas pressure thus unseats valve 22 and passes as at 24 flowing around piston 21, through chamber B and orifices 27 pressurizing chamber C to the same pressure as chamber A.

At this point, the piston assembly is pressurized on both the rod end and the blind end and is maintained in extended position, FIG. 1, with the pressure in chamber A acting upon the larger area of the blind end of the piston and working against the same pressure on the smaller area on the rod side of the piston.

By reversing the three-way valve, pressurized chamber A is opened to exhaust and goes to zero or to atmospheric pressure. The valve seal 22 remains sealed now sealing chamber B.

At this point the gas, such as air under pressure in chamber C expands through the piston rod orifices 27 to pressurize chamber B on the rod side of the piston. This forces the piston to retracted position, FIG. 3. In this connection the volumetric differential and pressure becomes less as the piston comes towards and to a rest position in accordance with Boyles law of gas. Seal 22 passes body orifice 28, FIG. 3, exhausting chambers B and C.

When chamber A is again pressurized, piston 21 will travel to the extended position; and then when chamber A is depressurized the said piston will automatically return. In travelling of piston 21 to position of FIG. 1, it moves with increased force since there is no pressure in chamber B acting on the rod side of the piston.

We claim:
1. A differential area gas cylinder-piston means comprising:
   a cylinder including centrally apertured blind end and rod end heads; means for supplying gas under pressure to said cylinder through its blind end aperture; said cylinder having a small orifice near its blind end head;
   a piston head and rod assembly including a piston head in the cylinder defining within it, between the piston head and the blind end head, a first chamber;
   the piston rod being a tube closed at both ends and sealed to the piston head, the interior of the rod defining a second chamber;
   with a third chamber being defined as an annular space between the piston head and the rod end head of the cylinder;
   said rod having a small orifice in its side wall adjacent the piston head and communicating the second and third chambers;
   and an edge sealing ring on the edge of the piston head of a form to provide a yieldable one-way valve between the first and third chambers formed for normally preventing communication between said chambers but yieldable only when the first chamber is pressurized and the piston head has bottomed on the blind end of the cylinder so as to permit communication only then between said first and third chambers;
   said cylinder orifice being so located as to be between the seal and the blind end head when the piston head has bottomed on the rod end head of the cylinder for venting the third chamber, said orifice being so located near said blind end as to be on the rod end side of said piston seal when said piston assembly is at said blind end of said cylinder.

References Cited

UNITED STATES PATENTS

| | | | |
|---|---|---|---|
| 1,550,254 | 8/1925 | Hewey | 91—402 |
| 2,677,933 | 5/1954 | Hopkinson | 91—402 |
| 3,078,065 | 2/1963 | Vickery | 92—134 |
| 3,147,671 | 9/1964 | Geyer | 91—416 |
| 3,232,180 | 2/1966 | Deschenes | 91—416 |
| 2,343,316 | 3/1944 | Newkirk | 91—416 |
| 2,740,859 | 4/1956 | Beatty et al. | 91—25 |
| 2,343,316 | 3/1944 | Newkirk | 91—416 X |
| 3,232,181 | 2/1966 | Blatt | 91—422 |

FOREIGN PATENTS 821,648   10/1959   Great Britain.

PAUL E. MASLOUSKY, *Primary Examiner.*